US007393134B2

(12) United States Patent
Mitschele

(10) Patent No.: US 7,393,134 B2
(45) Date of Patent: Jul. 1, 2008

(54) PARKING METER

(76) Inventor: Frederick L. Mitschele, 3627 West 10th Avenue, Vancouver, BC (CA) V6R 2G2

(*) Notice: Subject to any disclaimer, the term of this patent is extended or adjusted under 35 U.S.C. 154(b) by 0 days.

(21) Appl. No.: 11/237,061

(22) Filed: Sep. 28, 2005

(65) Prior Publication Data

US 2006/0028919 A1 Feb. 9, 2006

Related U.S. Application Data

(63) Continuation of application No. 09/857,007, filed as application No. PCT/CA99/00896 on Sep. 27, 1999, now Pat. No. 7,029,167.

(51) Int. Cl.
*G04F 1/00* (2006.01)
*G07F 17/54* (2006.01)
*B60Q 1/48* (2006.01)

(52) U.S. Cl. .......................... 368/90; 194/205; 194/217; 340/932.2; 340/933; 340/937

(58) Field of Classification Search .................. 368/10, 368/90–92; 194/200, 205, 210, 217; 340/932.2, 340/933, 937, 943
See application file for complete search history.

(56) References Cited

U.S. PATENT DOCUMENTS

| | | | | |
|---|---|---|---|---|
| 3,148,013 | A | 9/1964 | Tarsey | 346/20 |
| 4,001,822 | A | 1/1977 | Sterzer | 343/6.5 R |
| 4,325,146 | A | 4/1982 | Lennington | 455/604 |
| 4,379,334 | A * | 4/1983 | Feagins et al. | 705/418 |
| 4,823,928 | A * | 4/1989 | Speas | 194/217 |
| 4,967,895 | A * | 11/1990 | Speas | 194/200 |
| 5,339,000 | A | 8/1994 | Bashan et al. | 340/932.2 |
| 5,414,624 | A * | 5/1995 | Anthonyson | 701/1 |
| 5,442,348 | A * | 8/1995 | Mushell | 340/932.2 |
| 5,710,743 | A | 1/1998 | Dee et al. | 368/90 |
| 5,737,710 | A * | 4/1998 | Anthonyson | 701/1 |
| 5,777,951 | A | 7/1998 | Mitschele et al. | 368/90 |
| 5,845,268 | A | 12/1998 | Moore | 705/418 |
| 6,195,015 | B1 | 2/2001 | Jacobs et al. | 340/693.9 |
| 6,229,455 | B1 | 5/2001 | Yost et al. | 340/943 |
| 6,285,297 | B1 | 9/2001 | Ball | 340/932.2 |

FOREIGN PATENT DOCUMENTS

| | | |
|---|---|---|
| DE | 44 019 93 A1 | 7/1995 |
| EP | 0 193 320 A2 | 9/1986 |
| WO | WO 99/30290 | 6/1999 |

* cited by examiner

*Primary Examiner*—Vit W Miska
(74) *Attorney, Agent, or Firm*—Seed IP Law Group PLLC

(57) ABSTRACT

A parking meter includes a microcontroller and a timer coupled with a microcontroller. A mechanism for accepting payment by coin, credit card or both is coupled with the microcontroller for accepting payment for use of an associated parking space. The microcontroller initiates the timer for a prepaid parking interval upon receiving a signal from the payment acceptance mechanism. A vehicle detector is coupled with the microcontroller for detecting the presence or absence of a vehicle in the associated parking space. The microcontroller initiates an interrogation station to direct an interrogation signal at the associated parking space in the area of the parking space where the license plate of a parked vehicle is located upon determining the existence of a parking violation.

13 Claims, 5 Drawing Sheets

PARKING METER

TECHNICAL FIELD

The present invention relates to parking meters and, more particularly, parking meters which detect the presence or absence of a vehicle.

BACKGROUND ART

Prior parking meters are known which increase revenues by detecting the presence or absence of a vehicle U.S. Pat. No. 4,823,928 which issued to POM Incorporated in 1989, describes an electronic parking meter system that resets the timing circuit to zero when a vehicle is no longer detected in the associated parking space. The POM Incorporated parking meter is placed in an operational mode when a coin is deposited. When placed in the operational mode, a sonar range finder is turned on which detects the presence or absence of a vehicle in the associated parking space. The sonar range finder provides a signal to a microprocessor controller when the vehicle is no longer in the associated parking space, and the microprocessor controller resets the timer.

While the POM Incorporated parking meter assists in maximizing parking meter revenues, it does not catch parking meter violations. In order to catch parking meter violations, parking meter attendants and parking by-law enforcement officers patrol the streets. Typically, comparatively few enforcement officers are charged with responsibility for a huge number of parking meters, so enforcement is random, at best. This problem was addressed in the U.S. Pat. No. 5,777,951 which discloses a parking meter system in which a camera is used to record and store the image of the license plate of a parking violator. The parking meter includes a microcontroller and a timer coupled with the microcontroller. Payment acceptance means is coupled with the microcontroller for accepting payment for use of an associated parking space. The microcontroller initiates the timer for a prepaid parking interval upon receiving a signal from the payment acceptance means. Vehicle detection means is coupled with the microcontroller for detecting the presence or absence of a vehicle in the associated parking space. A communications modem is coupled with the microcontroller. The microcontroller initiates a call notifying authorities as to a parking violation upon the vehicle detection means signalling to the microcontroller the presence of a vehicle in the associated parking space after the expiration of the prepaid parking interval, or the microprocessor initiates the camera to take an image of a vehicle upon the vehicle detection means signalling to the microprocessor the presence of the vehicle in the associated parking space after the timer has signaled to the microprocessor the expiration of the prepaid parking interval. However in some instances, an experienced parking violator can prevent detection by obscuring the license plate with a covering, tape etc. There is therefore a need for a vehicle identification means for use with prior parking meter systems which is less vulnerable to circumvention.

DISCLOSURE OF INVENTION

According to the present invention there is provided a parking meter comprising;

i) a microcontroller;

ii) a timer coupled with the microcontroller;

iii) payment acceptance means coupled with the microcontroller for accepting payment for use of an associated parking space, such that the microcontroller initiates the timer for a prepaid parking interval upon receiving a signal from the payment acceptance means;

iv) vehicle detection means coupled with the microcontroller for detecting the presence or absence of a vehicle in the associated park space;

v) means for identifying a vehicle parked in the associated parking space, comprising an interrogation station coupled with the microcontroller, said interrogation station adapted to direct an interrogation signal at the associated parking space in the area of die parking space where the license plate of a parked vehicle is located, receive a reply signal encoded with a vehicle identification code and to decode said signal, the microcontroller initiating the interrogation station to direct an interrogation signal at the associated parking space in the area of the parking space where the license plate of a parked vehicle is located upon determining the existence of a parking violation; and vi) digital storage means for storing said decoded vehicle identification code.

BRIEF DESCRIPTION OF THE DRAWINGS

These and other features of the invention will become more apparent from the following description in which reference is made to the appended drawings, wherein.

BEST MODE(S) FOR CARRYING OUT THE INVENTION

Figure 1:
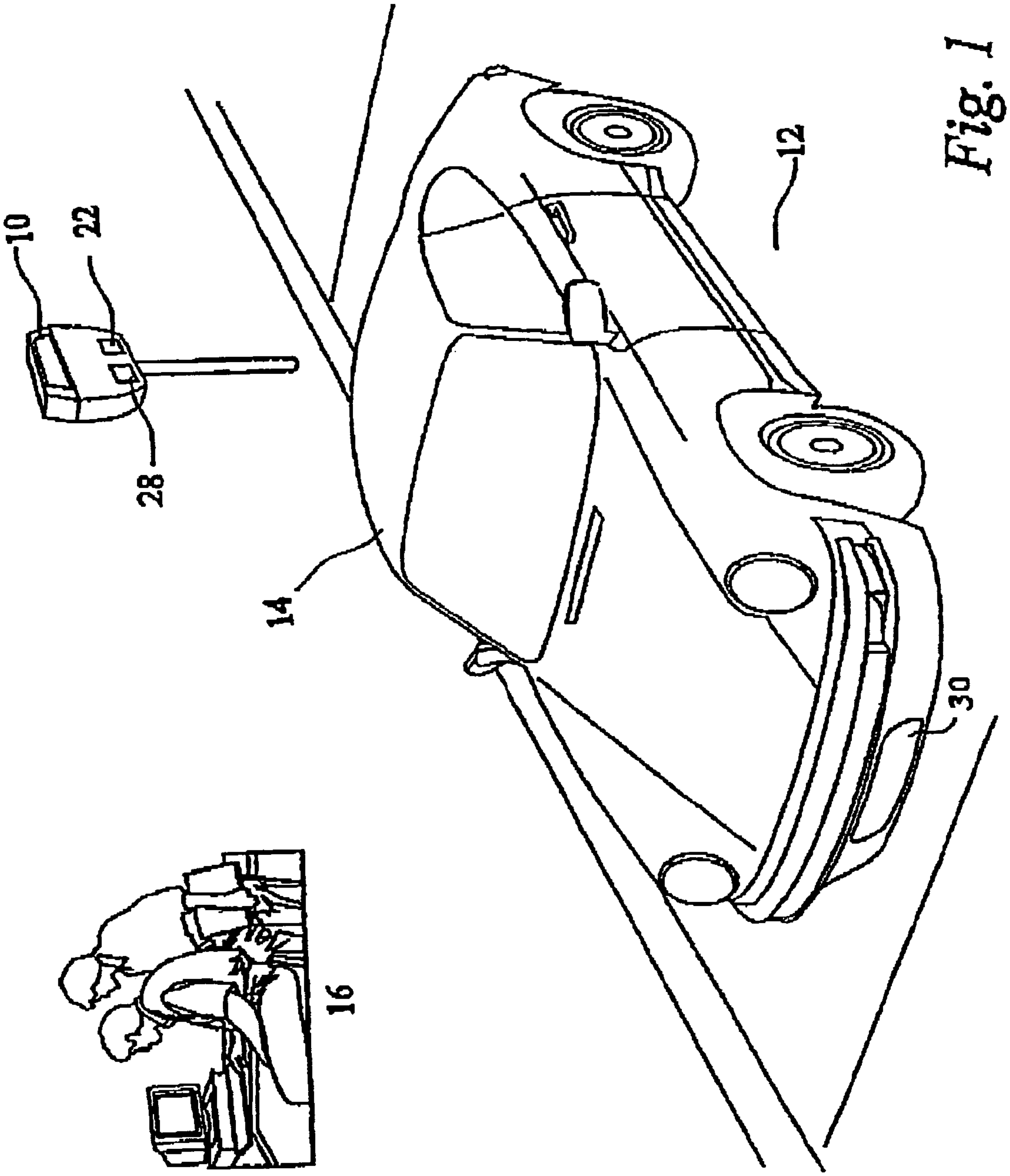
FIG. 1 is a perspective view of a prior art parking meter which detects the presence or absence of a vehicle.

The preferred embodiment, a parking meter generally identified by reference numeral 10, will now be described with reference to FIGS. 1 through 4.

Figure 2:
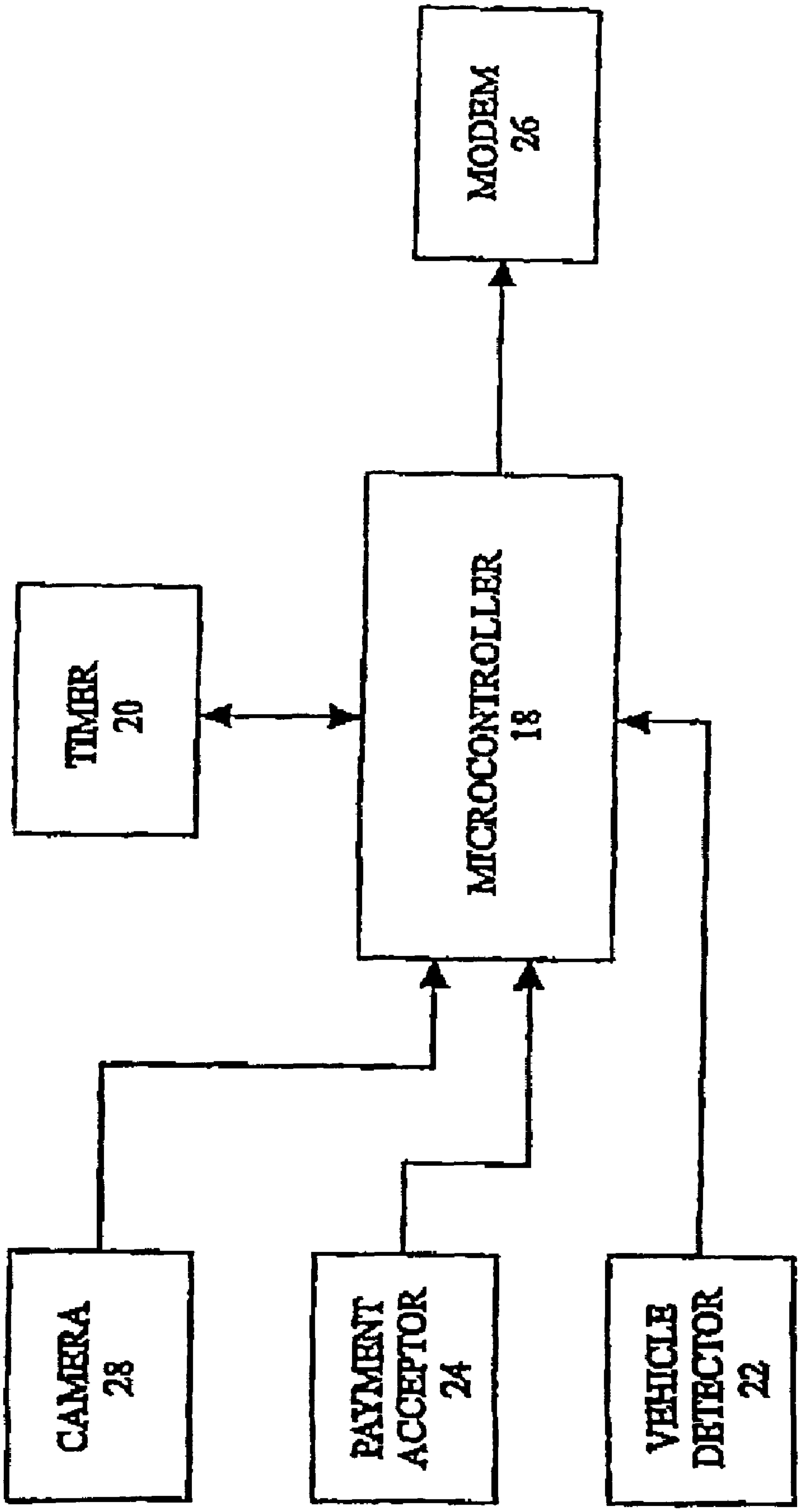
FIG. 2 is a block diagram of the components of the parking meter illustrated in FIG. 1.

Referring to FIG. 1, there is illustrated parking meter 10 and an associated parking space 12. A vehicle 14 is parked in associated parking space 12. Also illustrated is a remote monitoring station 16, the purpose and operation of which will hereinafter be further described. Referring to FIG. 2, the internal components of parking meter 10 include a microcontroller 18. A timer 20 is coupled with and controlled by microcontroller 18. A vehicle detector 22 is coupled with and sends signals to microcontroller 18. Referring to FIG. 1, vehicle detector 22 is focused at associated parking space 12 so that it detects the presence or absence of a vehicle, such as vehicle 14, in associated parking space 12. Referring to FIG. 2, a payment acceptance mechanism 24 is coupled with and sends signals to microcontroller 18. Payment acceptance mechanism 24 can be configured to accept payment by coin, credit card or both for use of associated parking space 12. A communications modem 26 is coupled with and controlled by microcontroller 18. A digital camera 28 is coupled with and controlled by microprocessor 18. Referring to FIG. 1, digital camera 28 is focused at one of the car 14 license plates 30 in associated parking space 12.

The use and operation of parking meter 10 will now be described with reference to FIGS. 1 and 2. Referring to FIG. 1, the operation of parking meter 10 is initiated by vehicle 14 pulling into associated parking space 12 and its presence being detected by vehicle detector 22. Microcontroller 18 initiates timer 20 for a predetermined standby interval upon receiving a signal from vehicle detector 22 that vehicle 14 is present in associated parking space 12. Should payment be made for use of associated parking space 12, microcontroller 18 will terminate the timing of the standby interval and initiate timer 20 for a prepaid parking interval upon receiving a signal from payment acceptance mechanism 24. A parking violation occurs when the operator of vehicle 14 either fails to make payment or when the prepaid parking interval expires. Microcontroller 18 initiates a call through communications modem 26 notifying parking authorities at monitoring station 16 as to a parking violation upon vehicle detector 22 signalling to microcontroller 18 the presence of vehicle 14 in associated parking space 12 after the expiration of either the standby interval or the prepaid parking interval.

While in U.S. Pat. No. 5,777,951, it was contemplated that concurrently with initiating a call notifying parking authorities as to the parking violation, microprocessor 18 would activate digital camera 28 to take a digital image of the license plate of vehicle 14, it has been discovered that parking violators will circumvent the system by wholly or partially covering the license plate when parked, such as with an attached covering or tape It has been found that this difficulty is addressed in a system where vehicles are equipped with an electronic identification license plate or tag which is read by the parking meter when a violation is detected. A suitable identification tag is disclosed in U.S. Pat. No. 4,001,822 entitled "Electronic License Plate for Motor Vehicles". As disclosed in that patent, each vehicle is provided with a license plate which not only has visible indicia, but also electronic circuitry which, when interrogated by an external signal at a predetermined frequency, emits a coded reply signal which communicates a vehicle identification code to the interrogating source, without the need for a power source on the license plate.

According to this invention, therefore, front and rear license plates 30 of vehicle 14 are provided with the electronic tag described above which is adapted to transmit the vehicle's unique identification number upon receipt of an external interrogation signal. Parking meter 10, shown in FIGS. 3 and 4, has a meter head 40 carrying payment mechanism 24 and time display window 42. A standard coin vault 44 is provided. Between meter head 40 and coin vault 44 is housing 46 which houses the circuitry for vehicle detector 22, microcontroller 18, communications modem 26, and an interrogator 32, as described in U.S. Pat. No. 4,001,822, which sends an interrogation microwave signal directed at the parking space 12, and receives the reflected coded signal from license plate 30, decodes it and communicates the identification number to microcontroller 18. As in the previous system, the operation of parking meter 10 is initiated by vehicle 14 pulling into associated parking space 12 and its presence being detected by vehicle detector 22. Microcontroller 18 initiates timer 20 for a predetermined standby interval upon receiving a signal from vehicle detector 22 that vehicle 14 is present in associated parking space 12. Should payment be made for use of associated parking space 12 microcontroller 18 will terminate the timing of the standby interval and initiate timer 20 for a prepaid parking interval upon receiving a signal from payment acceptance mechanism 24. A parking violation occurs when the operator of vehicle 14 either fails to make payment or when the prepaid parking interval expires. Upon occurrence of a parking violation, microcontroller 18 causes interrogator 32 to send an interrogation microwave signal directed at the parking space 12, and receives the reflected coded signal from license plate 30. The reply signal is decoded and the identification number is communicated to microcontroller 18 for storage and/or a call is initiated through communications modem 26 notifying parking authorities at monitoring station 16 as to a parking violation and providing the vehicle identification number.

While the preferred identification tag system is that disclosed in U.S. Pat. No. 4,001,822, other systems can also be useful in the invention, such as those disclosed in the following United States patents: U.S. Pat. No. 4,242,663 entitled "Electronic Identification System": U.S. Pat. No. 4,104,630 entitled "Vehicle Identification System, Using Microwaves"; U.S. Pat. No. 3,914,762 entitled "Electronic Identification System": and U.S. Pat. No. 3,798,641 entitled "Process and System for Identification of a Vehicle".

Figure 3:
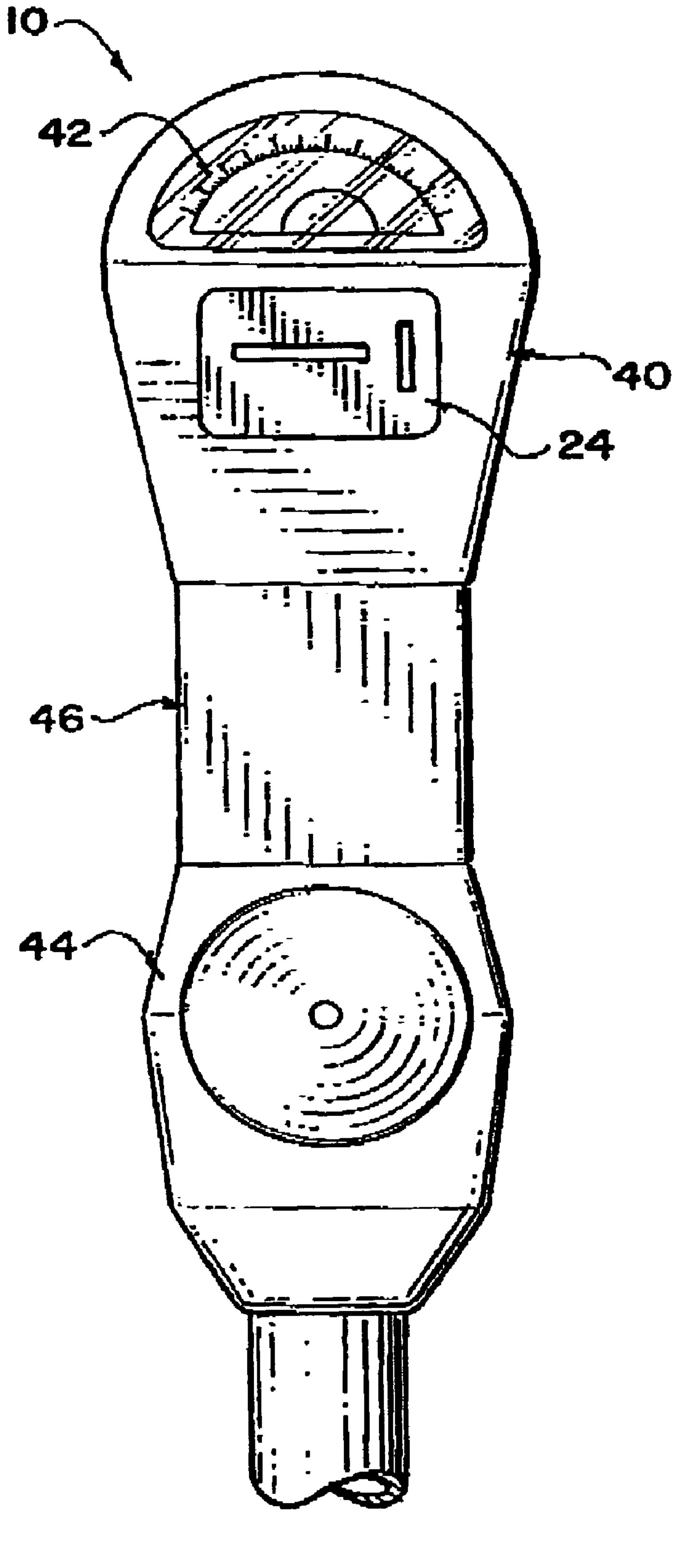
FIG. 3 is a front view of a second embodiment of the parking meter according to the invention.
Figure 4:
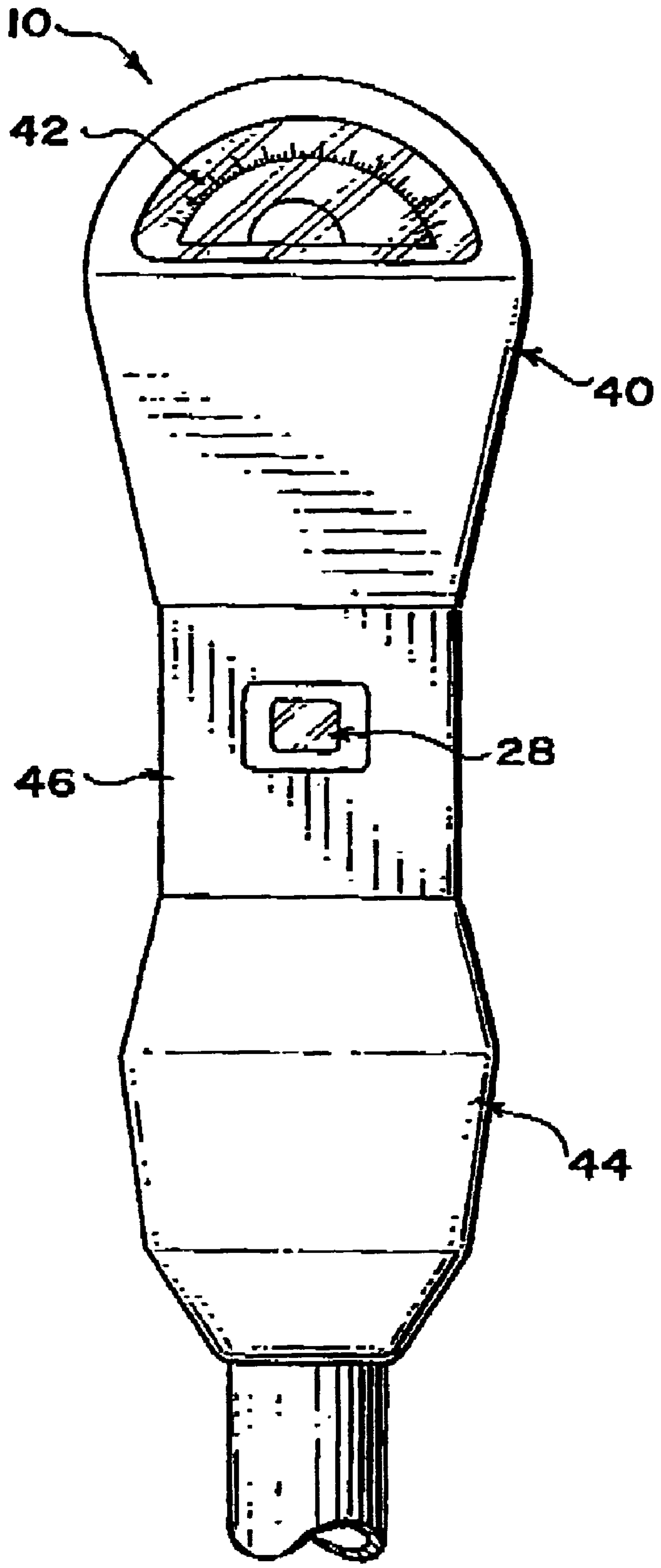
FIG. 4 is a rear view of a second embodiment of the parking meter according to the invention.
Figure 5:
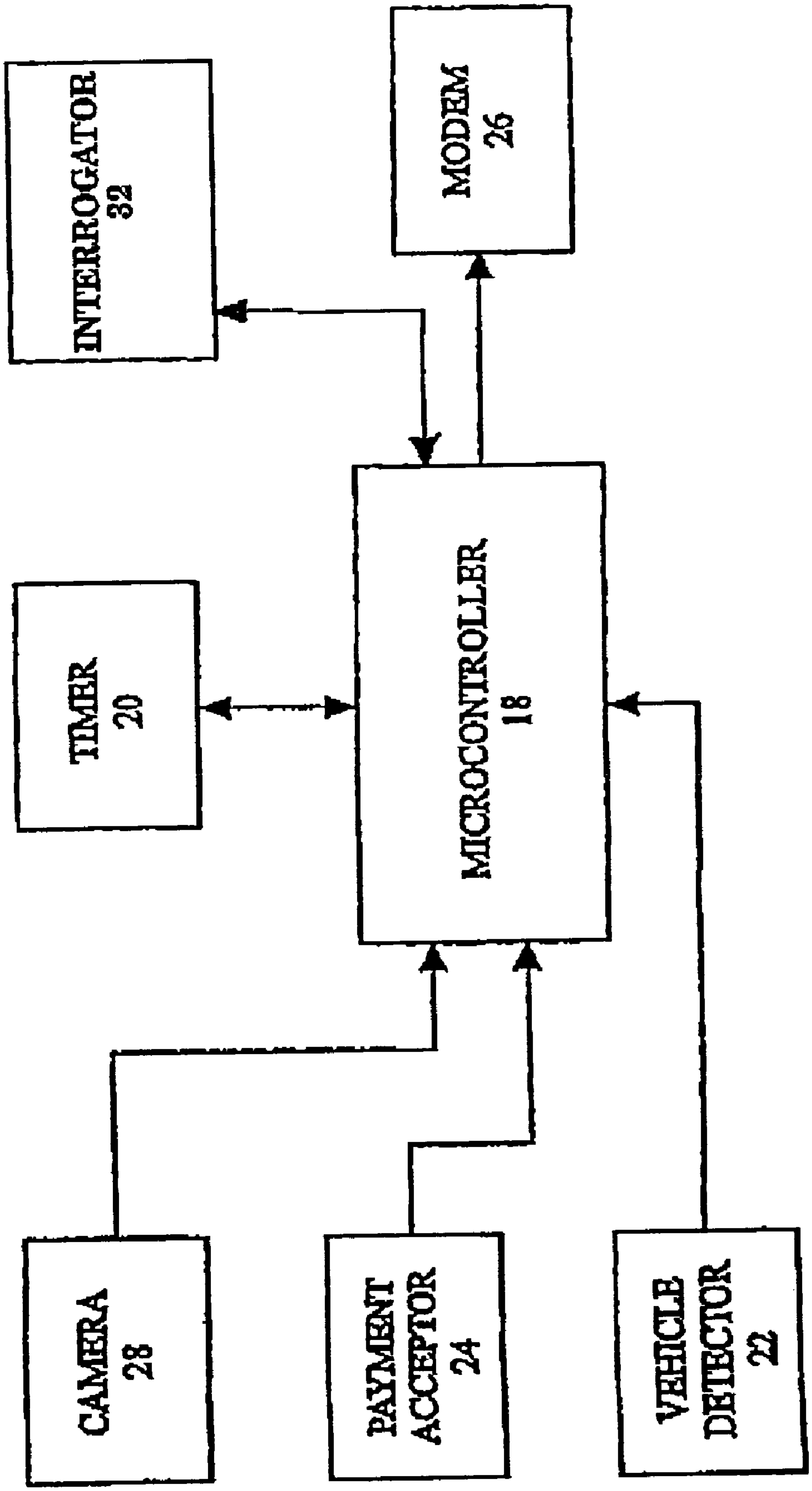
FIG. 5 is a block diagram of the components of the parking meter illustrated in FIG. 3.

Parking meter 10 in FIG. 3 may in addition be provided with a digital camera for use as both a vehicle sensor and vehicle identification. While in U.S. Pat. No. 5,777,951, it was contemplated that vehicle detector 22 would operate based upon such detection technologies as ultrasonic, infrared, or micro-powered radar, it has been discovered that camera 28 can also function as the detection means. By utilizing appropriate shape-distinguishing software, the image detected by the camera can be used to detect the presence or absence of a vehicle in the parking space 12. Such software must be capable of distinguishing large immobile objects, recognized as parked vehicles, including large and small vehicles and motorcycles, from irrelevant objects such as moving vehicles, humans, animals, bicycles etc. Such software is known from robotics applications and can function by comparing an earlier digital image to a later digital image, based on a selected time interval, or may be based on the size of the image footprint. By utilizing the camera as the vehicle detection means, the need for additional hardware is avoided and costs of the parking meter are reduced considerably. Camera 28 may be an infrared camera to function in low light situations. Other forms of vehicle detection would also be possible, such as in ground sensors of the type used to sense the presence of vehicles at stoplights. An example of such as in-ground sensor is the GROUND-HOG™ manufactured by Nu-metrics which is a wireless, self-contained, in-ground traffic monitor which e\transmits a signal upon detection of a vehicle. Such a sensor could also be integrated into parking meter 10.

Where a communications link between monitoring station 16 and parking meter 10 is provided, by modem 26 and land lines or wireless communication, it can be used for a number of secondary purposes. When parking meter 10 is not in operation a signal can be sent from monitoring station 16 to place microcontroller 18 in a dormant mode. Remote audit reporting can be conducted as required through communication between parking meter 10 and remote monitoring station 16.

In this application the term "credit card" has been used It is intended that this term encompass the entire spectrum of card form payments, including; debit cards, smart cards, stored value cards, proprietary parking cards, and parking passes. It will be appreciated by one skilled in that art that there are a variety of payment acceptance mechanisms that can be utilized, whether coin, paper bills, or credit card as described above.

What is claimed is:

1. A parking meter, comprising:

i) a microcontroller;

ii) a timer coupled with the microcontroller;

iii) payment acceptance means coupled with the microcontroller for accepting payment for use of an associated parking space, such that the microcontroller initiates the timer for a prepaid parking interval upon receiving a signal from the payment acceptance means;

iv) vehicle detection means coupled with the microcontroller for detecting the presence or absence of a vehicle in the associated parking space;

v) means for identifying a vehicle parked in the associated parking space, comprising an interrogation station coupled with the microcontroller, said interrogation station adapted to direct an interrogation signal, having a maximum range of approximately the length of the associated parking space or less, at the associated parking space in the area of the parking space where the license plate of a parked vehicle is located, receive a reply signal encoded with a vehicle identification code and to decode said signal, the microcontroller initiating the interrogation station to direct said interrogation signal at the associated parking space in the area of the parking space where the license plate of a parked vehicle is located upon determining the existence of a parking violation;

vi) digital storage means for storing said decoded vehicle identification code; and vii) a housing forming the head of said parking meter and containing within said housing said microcontroller and said interrogation station and having mounted thereon said payment acceptance means.

2. The parking meter of claim 1 further comprising:

viii) telecommunications means coupled with said microcontroller, the microcontroller initiating a call notifying a remote monitoring station upon determining the existence of a parking violation and communicating said vehicle identification code.

3. The parking meter of claim 2 wherein said telecommunications means is adapted to transmit said vehicle identification code to said remote monitoring station.

4. The parking meter of claim 1 wherein said microcontroller comprises a microprocessor.

5. The parking meter as defined in claim 1 wherein said vehicle detection means comprises an ultrasonic, radar or infrared detector.

6. The parking meter as defined in claim 2 wherein said telecommunications means comprises a modem.

7. The parking meter as defined in claim 1, wherein the microcontroller initiates the timer for a predetermined standby interval upon receiving a signal from the vehicle detection means that a vehicle is present in the associated parking space, wherein said microcontroller is adapted to terminate the timing of the standby interval upon receiving a signal from the payment acceptance means, and said microcontroller initiates the interrogation station to direct an interrogation signal at the associated parking space in the area of the parking space where the license plate of a parked vehicle is located after expire of said standby interval without receiving a signal from said payment acceptance means that a payment has been made.

8. The parking meter as defined in claim 2, wherein the microcontroller initiates the tinier for a predetermined standby interval upon receiving a signal from the vehicle detection means that a vehicle is present in the associated parking space, the microcontroller is adapted to terminate the timing of the standby interval upon receiving a signal from the payment acceptance means, and the microcontroller initiates a call to said remote monitoring station as to a parking violation after the expiration of the standby interval without receiving a signal from said payment acceptance means that a payment has been made.

9. The parking meter as defined in claim 1, wherein the microcontroller determines the existence of a parking violation upon the vehicle detection means signalling to the microcontroller the presence of a vehicle in the associated parking space after expire of said prepaid parking interval.

10. The parking meter as defined in claim 2, wherein the microcontroller determines the existence of a parking violation upon the vehicle detection means signalling to the microcontroller the presence of a vehicle in the associated parking space after expire of said prepaid parking interval.

11. The parking meter as defined in claim 1 wherein said vehicle detection means coupled with said microcontroller for detecting the presence or absence of a vehicle in the associated parking space comprises an inpavement magnetic field sensor adapted to transmit a signal to said microcontroller upon detection of a vehicle in said associated parking space.

12. A parking meter, comprising:

i) a microcontroller;

ii) a timer coupled with the microcontroller;

iii) payment acceptance means coupled with the microcontroller for accepting payment for use of an associated parking space, such that the microcontroller initiates the timer for a prepaid parking interval upon receiving a signal from the payment acceptance means;

iv) vehicle detection means coupled with the microcontroller for detecting the presence or absence of a vehicle in the associated parking space;

v) means for identifying a vehicle parked in the associated parking space, comprising an interrogation station coupled with the microcontroller, said interrogation station adapted to direct an interrogation signal at the associated parking space in the area of the parking space where the license plate of a parked vehicle is located, receive a reply signal having a maximum range of approximately the length of the associated parking space or less encoded with a vehicle identification code and to decode said signal, the microcontroller initiating the interrogation station to direct said interrogation signal at the associated parking space in the area of the parking space where the license plate of a parked vehicle is located upon determining the existence of a parking violation;

vi) digital storage means for storing said decoded vehicle identification code; and vii) a housing forming the head of said parking meter and containing within said housing said microcontroller and said interrogation station and having mounted thereon said payment acceptance means.

13. The parking meter as defined in claim 1 wherein the payment acceptance means is configured to accept paper bills.

* * * * *